July 13, 1965 J. D. SCHALOW 3,194,005
TERMINAL ACTUATOR FOR PARKING METER
Filed Nov. 7, 1962 2 Sheets-Sheet 1
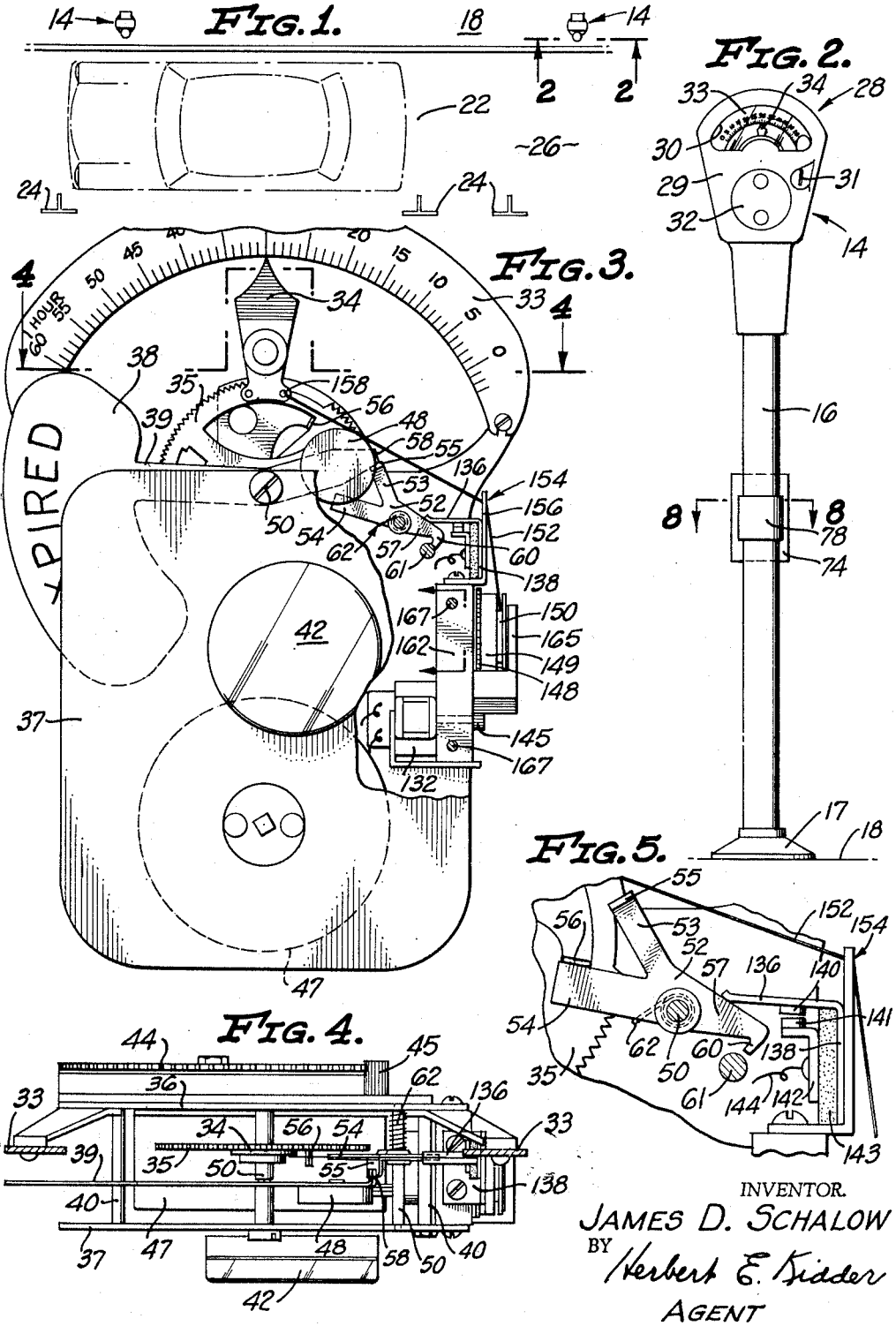
INVENTOR.
JAMES D. SCHALOW
BY Herbert E. Kidder
AGENT July 13, 1965 J. D. SCHALOW 3,194,005
TERMINAL ACTUATOR FOR PARKING METER
Filed Nov. 7, 1962 2 Sheets-Sheet 2
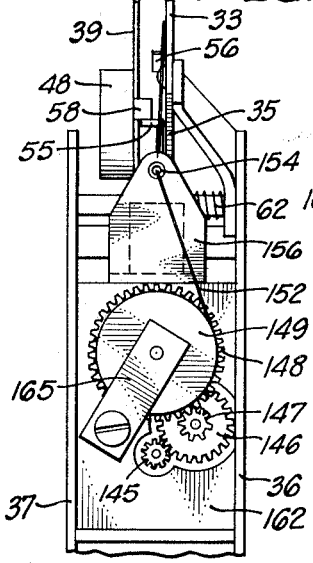
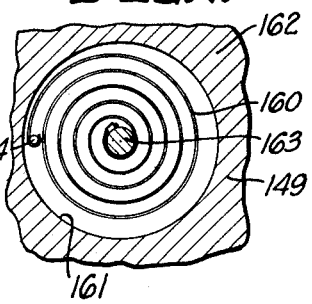
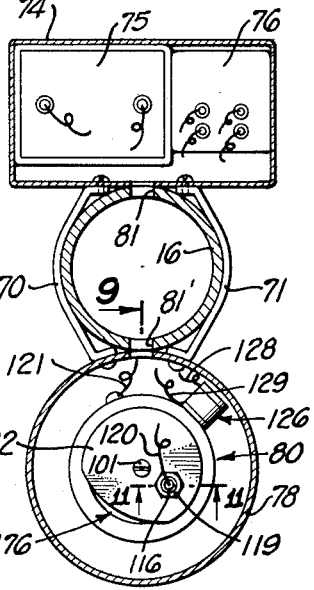
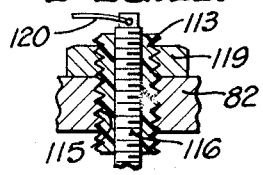
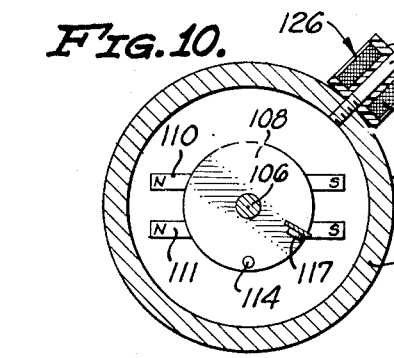
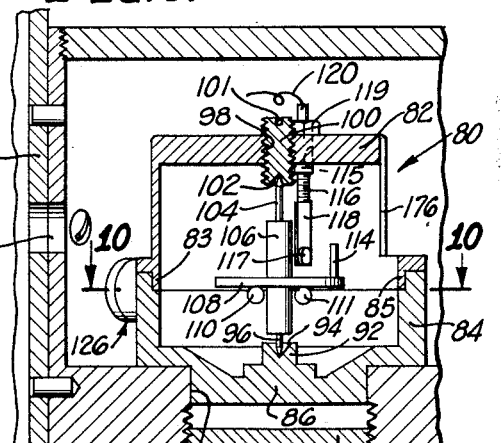
INVENTOR.
JAMES D. SCHALOW
BY Herbert E. Kidder
AGENT

United States Patent Office 3,194,005
Patented July 13, 1965

3,194,005
TERMINAL ACTUATOR FOR PARKING METER
James D. Schalow, La Sierra, Calif., assignor to
Richard J. Pernosky, Garden Grove, Calif.
Filed Nov. 7, 1962, Ser. No. 236,012
4 Claims. (Cl. 58—142)

The present invention relates generally to coin-operated automobile parking meters, and more particularly to a device for automatically cancelling any time remaining on the meter when the automobile is driven away from the associated parking space.

With the conventional parking meter, any unused time remaining on the meter at the time the parking space is vacated, may be appropriated by the next automobile that occupies the space. Many times, a driver wanting to park only momentarily, finds it necessary to use a coin that puts an hour or two of parking time on the meter, and when his car is driven away, the parking space may be used free by other cars until the meter time has expired. One of the justifications for metered parking is that each automobile operator should pay a nominal fee for the privilege of parking on the public street for a limited period of time. The parking privilege is considered to be a personal transaction between the municipality and the automobile operator, and is not intended to extend to any one other than the individual who paid for that privilege. The operator who parks his automobile in a space where there is time remaining on the parking meter is thus avoiding the levy of the parking fee, and thereby deprives the municipality of needed revenue.

The primary object of the present invention is to provide a terminal actuator for coin-operated parking meters, which will automatically reset the timer mechanism to zero when the automobile is driven away from the parking space. This makes it necessary for each automobile operator to pay the required fee for the privilege of parking, and eliminates the practice of utilizing the unused residue of time paid for by another.

Another important object of the invention is to provide a device of the class described, which is actuated by the directional shift of the lines of force of the earth's magnetic field as the automobile is driven away from the parking space, to cancel any time remaining on the meter.

A further object of the invention is to provide a terminal actuator for parking meters that is entirely self-contained on the meter post and requires no coils which must be embedded in the pavement at great expense, nor other appendages such as pneumatic tubes on the pavement surface which are subject to being damaged by street sweepers, and which deteriorate rapidly due to exposure to the elements. Another advantage of the invention is that it is self-contained as to power requirements and does not need to be connected to an external source of electrical power.

Still another object of the invention is to provide a terminal actuator of the class described, which can be adapted to practically all existing parking meters at relatively low cost and with a minimum of modification to the meter. This is an important advantage, as there are millions of otherwise satisfactory parking meters in operation, and the cost of replacing these meters with completely new meters of special design would involve tremendous expense.

A further object of the invention is to provide a battery-powered terminal actuator for parking meters, which is designed to provide a long period of operation with inexpensive dry-cell batteries. This object is achieved by means of a novel circuit arrangement which is normally open, and which is closed only momentarily during the meter resetting operation, so that the current drain is extremely small. As a result, battery life is measured in months, and replacement of the batteries may be quickly accomplished.

The foregoing and other objects and advantages of the present invention will become apparent to those skilled in the art upon consideration of the following detailed description of the preferred embodiment thereof, reference being had to the accompanying drawings, wherein:

FIGURE 1 is a view looking down at a portion of a street parking area, showing one parking space occupied by an automobile and one end of an adjacent parking space, together with associated parking meters embodying the principles of the invention;

FIGURE 2 is a side elevational view of one of the parking meters as seen from the street side along the line 2—2 of FIGURE 1;

FIGURE 3 is an enlarged elevational view of the operating head of the meter, with part of the housing broken away to show internal structure;

FIGURE 4 is a sectional view taken through the upper head area along the line 4—4 of FIGURE 3, showing the lower mechanism in top plan;

FIGURE 5 is an enlarged fragmentary view of a portion of the exposed mechanism of FIGURE 5 showing circuit contacts in open condition, as when the meter has expired;

FIGURE 6 is an elevational view of the operating mechanism, as viewed from the right of FIGURE 3;

FIGURE 7 is an enlarged fragmentary view, taken at 7—7 of FIGURE 3;

FIGURE 8 is an enlarged horizontal sectional view through the meter post, battery and detector unit, taken at 8—8 in FIGURE 2;

FIGURE 9 is a further enlarged sectional view taken through the detector unit along the line 9—9 of FIGURE 8;

FIGURE 10 is a horizontal section through the inner portion of the detector unit, taken at 10—10 in FIGURE 9;

FIGURE 11 is an enlarged fragmentary view through the contact post of the detector unit, taken at 11—11 in FIGURE 8; and FIGURE 12 is a schematic diagram, showing the electrical circuit of the device.

As seen in FIGURES 1 and 2, the parking meter 14 of the present invention is mounted atop an upright post or tubular support 16, which has its lower end fastened to a base member 17 overlying or affixed to the sidewalk or curb 18 closely adjacent the forward end of the associated parking space 22, which may be suitably designated by paint lines 24 or other indicia placed upon the surface of a street or drive-way 26.

The operating head of the meter is designated in its entirety by the reference numeral 28, and is enclosed within a protective housing 29 having a transparent window 30, a coin-deposit slot 31, and a removable closure panel 32 provided with suitable locking means. Visible through the window 30 is a fixed, arcuately curved dial or scale 33 graduated in units of time, such as minutes or multiples thereof. The scale 33 stands in a vertical plane, and also disposed within this same vertical plane slightly below the scale is a pointer 34, which is carried by a peripherally toothed disc or gear wheel 35. The gear 35 constitutes the final driven element of what is essentially a clockwork mechanism, and the pointer 34 corresponds to the minute hand of a clock, in that it moves along the arcuate dial 33 at the correct rate to show the number of minutes remaining before the time expires. When one or more coins are inserted into the slot 31, the pointer 34 is initially turned to the time interval allowed for the amount paid, and it is then returned by the clockwork mechanism to its starting or rest position (extreme right of FIGURE 3) within the specified time, where it triggers the elevation of the "flag" 38 which shows that the time has expired.

The operating mechanism of the meter is disposed between a pair of laterally spaced, parallel side plates 36 and 37, that are joined together by means of transverse tubular members 40. Mounted on the outside of plate 37 is a governor mechanism 42, and on the outer side of the opposing plate 36 is a gear 44 meshing with a small pinion 45. The gear 44 and pinion 45 are part of the operating mechanism of the meter head, and inasmuch as this portion of the mechanism forms no part of the invention, it is not deemed necessary to describe the same in more detail here. The mechanism also includes a spring motor 47, which is connected by the usual train of gears to the final driven gear 35.

The "expired" flag 38 is carried at one end of an arm 39 which is rotatably supported intermediate its ends on a pivot pin 49. The arm 39 swings in a vertical plane between the horizontal position shown in FIGURE 3, and a vertical position within the window opening. A weight 48 is attached to the other end of the arm 39 and overbalances the weight of the flag 38, so that the weight tends to drop downwardly unless held up. Means is provided for holding up the weight 48, in the form of a latch 52, which is pivoted intermediate its ends on a pin 50. One end of the latch 52 is bifurcated to form arms 53 and 54. Arm 54 is positioned where it can be engaged and depressed by a lug 56 projecting laterally from one side of the gear wheel 35. When the pointer 34 and its supporting gear wheel 35 are turned counterclockwise (as seen in FIGURE 3) by insertion of a coin in the slot 31, the latch 52 is turned in the clockwise direction by a torsion spring 62, until the end 60 of the other arm 57 hits a stop 61, at which point a laterally projecting ear 55 on arm 53 is positioned to engage and support an outwardly turned ear 58 on the weighted end of the flag arm 39 (FIGURE 3). Thus, the weight 48 is supported by the latch arm 53 until the latch is released by engagement of arm 54 by the lug 56 at the end of the parking time, at which point the "expired" flag 38 swings up to show through the windows.

About half-way up on the post 16 are mounted two boxes, or housings 74 and 78, which are attached to the post by means of bowed bracket arms 70 and 71 (see FIGURE 8) that embrace the post on opposite sides thereof. Housing 74 is a generally rectangular, box-like housing mounted on the back side of the post, which holds a battery 75 and transistor relay box 76. Housing 78 is mounted on the front, or street side of the post 16, and is a generally cylindrical container housing a detector unit 80. Electrical conductor wires from the elements within each housing 74, 78, enter the hollow interior of the standard 16 by way of adjacent openings 81, 81', respectively, and are thence led upwardly to the operating head 28.

The detector unit 80 is contained within a two-piece inner housing consisting of an upper section 82 and a lower section 84, each of which is generally cup-shaped, and the two of them are joined along a horizontal median plane by an interfitting engagement of an annular rib 83 within groove 85. The lower housing section 84 is formed with a downwardly projecting cylindrical base 86 which is rotatably disposed within a central cavity 88 in the bottom of the outer housing 78, for the purpose of initial adjustment, as will be explained presently. The bottom end of the cavity 88 is closed by an edge-threaded disc 89.

Projecting upwardly from the bottom of the lower section 84 is a central boss 92, the top of which has a conical depression 94 formed therein to receive the pointed end of a vertically disposed pivot 96. The flat top of the upper shell 82 is provided with a tapped bore 98 in vertical alignment with the boss 92, which receives a threaded screw 100 having a slotted top 101 and a conical seat 102 formed in its bottom end to receive an upwardly directed needle point pivot 104. The two vertically aligned needle pivots 96, 104, are located at opposite ends of a rotatable shaft 106, which has a circular flange 108 projecting radially from its midpoint. Secured to the underside of the flange 108 on opposite sides of the shaft 106 are two parallel bar magnets 110, 111, extending lengthwise beyond the flange at each end. The bar magnets 110, 111, are arranged with their "notch" poles on one side of the pivot shaft 106 and their "south" poles on the other side thereof, so that they reinforce one another and provide increased sensitivity to the earth's magnetic field.

Fixed to the top side of the flange 108 and projecting upwardly therefrom is a contact post 114, which moves along an arcuate path as the member 106, 108 rotates, to engage a stationary electrical contact 117. The stationary contact 117 is attached to the free end of a leaf spring 118, extending downwardly from the bottom end of a threaded post 116. The post 116 is screwed into and extends all the way through an insulating sleeve 113, which is externally threaded and, in turn, is threaded into a tapped hole 115 in the top end of upper housing section 82. The sleeve 113 is secured against turning by means of a locknut 119. At its outer end, the post 116 is connected by a wire 120 to the electrical circuit, which will be described presently. A second wire 121 is connected to the detector unit lower housing section 84 (see FIGURE 8), and this is connected to the circuit as shown in FIGURE 12, so that current from the positive side of the battery 75 is transmitted to the contact post 114.

Attached to the outside of the lower shell 84 by means of a screw 124 of brass or aluminum, is a spool-shaped core 122 of plastic, which is wound with magnet wire 125 to form an electromagnet 126. The purpose of the electromagnet 126 is to provide a strong temporary magnetic field that will attract the S end of the bar magnets when the automobile is driven away from the parking space, so as to temporarily amplify the effect of the earth's magnetic field in holding contact 114 tightly against contact 117 until the meter re-setting operation is completed. Current to energize the electromagnet 126 is carried by two wires 128 and 129, which are connected into the electrical circuit, as shown in FIGURE 12. The electromagnet 126 functions as a locking coil, and is shown connected in series with a motor 132 in the operating head 28, through a relay switch 134. Continuous energizing of the coil 126 holds the contacts 114, 117 tightly together to enable them to carry the current required to drive the motor 132.

By way of example, the battery 75 may be a 6-volt dry cell battery, and the motor 132 may be a 6-volt D.C. motor drawing from 50 to 100 milliamperes. The electromagnet 126 may be wound with a fairly large magnet wire, of sufficient turns to give a total resistance not greater than about 5 ohms. This has been found to produce a voltage drop of from one-half to one-quarter volt across the electromagnet, with a current drain of 100 milliamperes to 50 milliamperes by the motor.

In order to eliminate any possible current drain from the battery 75 when the parking space is vacated and the "expired" flag is showing in the window 30, the electrical circuit is kept open by means of two contacts 140 and 141, which are normally held apart by upward pressure of a latch arm 57 against the outer end of one arm 136 of an L-shaped bracket 138. Contact 140 is attached to the underside of arm 136 adjacent the midpoint thereof, and spring tension in the arm 136 urges the contact 140 down toward contact 141. The latter is attached to a bracket 142, which is supported on the bracket 138 but electrically isolated therefrom by an insulator 143. When the meter has run down and the "expired" flag is up, latch 52 is positioned as shown in FIGURE 5, and arm 57 engages and lifts the outer end of bracket arm 136, raising contact 140 away from contact 141. A wire 144 connects contact 141 to the negative side of the battery 75, as shown in FIGURE 12, while contact 140 is connected directly to the frame of the meter mechanism, thereby grounding the battery.

When the motor 132 is energized, it operates to pull the pointer 34 back to the zero end of the scale 33, and to this end, a driving pinion 145 is mounted on the motor drive shaft, which meshes with a series of speed-reducing gears 146, 147, and 148, to drive a drum 149 in the clockwise direction, as viewed in FIGURE 6. Drum 149 has a circumferential groove 150 provided therein (see FIGURE 3) and a thin, flexible cord 152 is attached at one end to the bottom of this groove at the right-hand end of the drum, as viewed in FIGURE 6, and passes upwardly therefrom through an eye 154 in the top end of a bracket arm 156 to a point of attachment at 158 to the pointer 34. Thus, when the drum 149 is driven in the clockwise direction (FIGURE 6) by the motor 132, the line 152 is wound up onto the drum, pulling the pointer 34 and its supporting gear 35 over toward the right (FIGURE 3). There is the usual releasable driving connection between the gear 35 and the pinion just ahead of it, which permits the gear 35 to be pulled around in the clockwise direction without driving the train of gears against the force of the spring motor 47.

The cord 152 must be unwound from the drum 149 to provide slack so that the pointer can be moved back to the left-hand end of the scale 33 when another coin is inserted in the meter. This is accomplished by a spring driving means which returns the drum 149 to its initial position when the motor 132 ceases to operate. The said spring driving means comprises a spiral torsion spring 160 which is contained within a cavity 161 (see FIGURE 7) formed in one side of a supporting block 162, directly under the drum 149. One end of the spring 160 is attached to a rotatable shaft 163, which is fixed to the drum 149 and extends into the cavity 160 at the center thereof; the other end of the spring being anchored to a stationary pin 164 that is attached to the block 162 adjacent one side of the cavity 161. The drum 149 is rotatably supported on its outboard side by a bracket arm 165, which is integrally fixed to the supporting block 162.

When the drum 149 is driven in the clockwise direction (FIGURE 6) by the motor 132, the spring 160 is wound tight. Then, when the motor stops, the spring 160 drives the drum in the counterclockwise direction, thereby unwinding the cord 152 from the drum to provide the necessary slack. In driving the drum 149 counterclockwise, the spring 160 also drives the motor 132 backward through the gears 148, 147, 146 and 145, which has the effect of slowing down the rotation of the drum, owing to the drag of the motor. The supporting block 162 and its associated parts is inserted between the side plates 36 and 37 of the meter head, and is secured thereto by screws 167.

Since the pressure of the contact 114 against contact 117 is due solely to the torsional pull of the earth's magnetic field on the bar magnets 110, 111, it will be evident that this pressure is extremely light, and it is difficult to obtain thereby a good enough electrical contact for any appreciable current flow, particularly in view of the low voltage obtained with the batteries 75. In order to utilize the small current passing through contacts 114, 117, for control purposes, I connect contact 117 by the wire 120 to the base 168 of an NPN transistor 170. The emitter 171 is connected to ground, and the collector 172 is connected in series with the coil 173 of relay switch 134, which is connected, in turn, to the positive side of the battery 75. The relay switch 134 has a movable contact 174, which closes against a stationary contact 175. Contact 174 is connected directly to battery 75, and contact 175 is connected by wire 128, windings 125 of electromagnet 126, and wire 129 to motor 132. Thus current to drive the motor 132 is carried by contacts 174 and 175, while the relatively feeble current carried by contacts 114 and 117 is merely used to control the transistor 170, which then allows a much larger current to flow from the collector to the emitter. It is this latter current flow which energizes the coil 173 of the relay switch 134. As the pointer 34 reaches the zero end of the scale 33, contacts 140 and 141 are opened, and this opens the circuit to completely de-energize the same. The transistor 170 and relay switch 134 are mounted in the box 76, which is carried within the container 74.

At the time the meter is installed, the detector unit 80 is adjusted by turning the top housing section 82 with respect to the bottom section 84 until the contact 114 is lightly closed against contact 117 when there is no automobile in the parking space. A window opening 176 in the side of the housing section 82, enables the operator to watch the contacts 114, 117 as this adjustment is made. The bar magnets 110, 111 are now lined up with the lines of force of the earth's magnetic field, in exactly the same manner as the needle of a compass.

When an automobile is driven into the parking space, the lines of force are shifted slightly in direction, due to the close proximity of the large mass of iron and steel in the automobile body and motor, causing the rotor 108 to turn slightly as the magnets 110, 111 realign themselves with shifted lines of force. This turning of the rotor 108 causes the contact 114 to separate from contact 117, thereby opening the circuit. When a coin is inserted into the slot 31, the pointer 34 is pushed over to the left, and the "expired" flag 38 is locked down out of sight, while at the same time, contacts 140, 141 are closed. The clockwork mechanism gradually returns the pointer 34 to the right, and as it reaches the zero end of the scale 33 (or a few minutes of grace thereafter) the latch 52 releases the "expired" flag and allows it to swing up into the window, at the same time opening the contacts 140, 141.

However, if the automobile is driven away from the parking space before the expiration of the time on the meter, the rotor 108 is turned by the directional shift of the lines of force of the earth's magnetic field, causing the contacts 114, 117 to close. This sends a small current through the transistor base 168 to the emitter 171, which causes a much larger current to flow from the collector 172 to the emitter 171, and this latter current flow energizes the relay coil 173 to close contacts 174, 175. Current is then transmitted to the motor 132 to drive the same, causing the pointer to return to zero.

While I have shown and described in considerable detail what I believe to be the preferred form of my invention, it will be understood by those skilled in the art that various changes may be made in the shape and arrangement of the several parts without departing from the broad scope of the invention as defined in the following claims.

I claim:

1. In a coin operated parking meter having a clockwork mechanism which is operable, upon insertion of a coin, to position an indicator with respect to a dial graduated in units of time so as to indicate the remaining time for which a car may legally remain in a designated parking area, said mechanism being operable to return said indicator to zero upon expiration of the time paid for, a device for returning said indicator to zero when said car is removed from said parking area prior to the expiration of the time paid for, comprising:

a pivoted detector having at least one bar magnet mounted thereon which tends to align itself with the lines of force of the earth's magnetic field, said detector being swingable between a first position parallel to the lines of force present when there is a car in said designated parking area and a second position when there is no car in said parking area;

a housing of non-magnetic material enclosing and supporting said pivoted detector;

a pair of switch contacts, one of which is mounted on said housing and the other on said pivoted detector, said contacts being open when said detector is at said first position and closed by the detector when the latter is at said second position;

a motor operatively connected to said indicator to return the same to zero when energized;

a battery;

circuit means connecting said battery to said motor, including a normally open relay switch;

electrical means connected to said pair of switch contacts and operable, when said pair of switch contacts are closed, to energize said relay switch to close the same; and an electromagnet positioned adjacent said detector and operable, when energized, to pull said pivoted detector more strongly toward said second position so as to make better electrical contact between said pair of switch contacts, said electromagnet being connected with said circuit means and energized thereby when said detector is moved to said second position.

2. A device as set forth in claim 1, wherein said detector housing is rotatably supported for angular adjustment about the pivot axis of said detector, whereby said contact mounted on said housing may be adjustably positioned with respect to the direction of the lines of magnetic force so that said contacts will be open when there is a car in said parking area and will be closed due to turning movement of said detector when said car is removed, regardless of the orientation of said meter with respect to said parking area.

3. A device as set forth in claim 2, having an electromagnet mounted on said rotatable detector housing in a position to exert a strong magnetic attraction on said bar magnet, when energized, tending to pull said contact on said detector firmly against said contact on said housing, said electromagnet being serially connected with said normally open relay switch whereby it is energized when said normally open switch is closed by said relay.

4. In a coin operated parking meter having a clockwork mechanism which is operable, upon insertion of a coin, to position an indicator with respect to a dial graduated in units of time so as to indicate the remaining time for which a car may legally remain in a designated parking area, said mechanism being operable to return said indicator to zero upon expiration of the time paid for, a device operable to return said indicator to zero when said car is removed from said parking area prior to expiration of the time paid for, said device comprising:

(a) a detector housing of non-magnetic material rotatably supported for angular adjustment about a generally vertical axis, (b) a detector pivoted on said housing for free turning movement, said detector having at least one bar magnet mounted thereon which tends to align itself with the lines of force of the earth's magnetic field, said detector being swingable between a first position parallel to the lines of magnetic force obtained when there is a car in said designated parking area and a second position when there is no car in said parking area, (c) a battery, (d) a motor operatively connected to said indicator to return the same to zero when energized, (e) a first circuit connecting said battery to said motor, including a normally closed switch between said battery and ground, and a normally open switch in series therewith, (f) a sensitive relay operable, when energized, to close said normally open switch, (g) a contact mounted on said pivoted detector and engageable with a companionate contact mounted on said housing, (h) a second circuit connecting said battery to said contacts on said detector and said housing, said second circuit being operable to energize said sensitive relay when said contacts are closed, (i) an electromagnet mounted on said detector housing in a position to exert a strong magnetic attraction on said bar magnet, when energized, tending to pull said contact on said detector strongly against said contact on said housing, said electromagnet being serially connected with said normally open switch whereby it is energized when the latter is closed by said sensitive relay, and (j) means on said indicator operable to open said normally closed switch when said indicator is returned to zero.

References Cited by the Examiner

UNITED STATES PATENTS

| | | | |
|---|---|---|---|
| 1,973,275 | 9/34 | Babson | 194—6 |
| 2,535,472 | 12/50 | Wood | 58—142 |
| 2,575,650 | 11/51 | Alexander | 58—142 |
| 2,652,551 | 9/53 | Gompertz et al. | 340—51 |
| 2,681,960 | 6/54 | Ellison | 200—87 |
| 2,983,097 | 5/61 | Ewing | 58—142 |
| 3,018,615 | 1/62 | Minton et al. | 58—142 |

LEYLAND M. MARTIN, *Primary Examiner.*

LEO SMILOW, *Examiner.*